Figure 1:
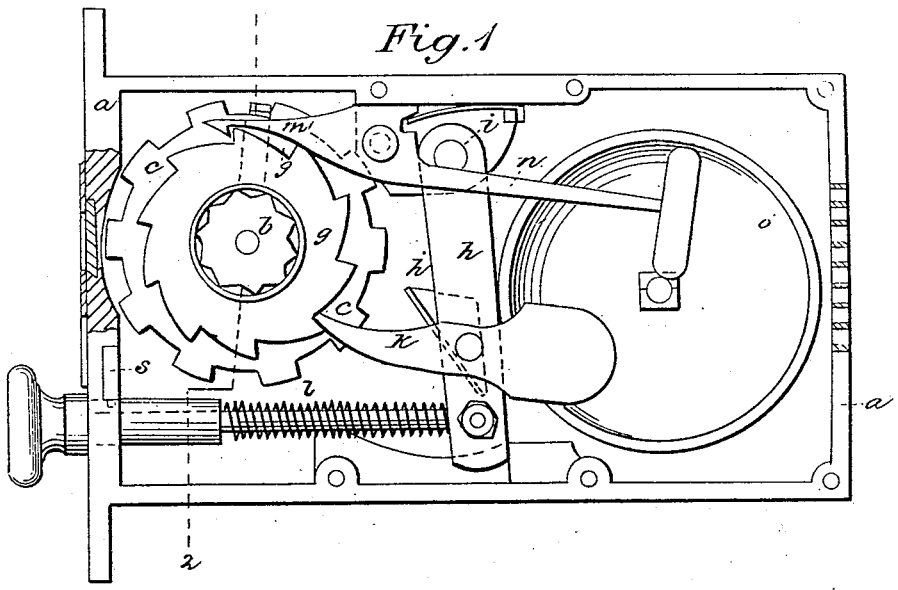

T. OLLIS.
Passenger Register.

No. 98,098. Patented Dec. 21, 1869.

Witnesses:
Chas. Nida
Jno. H. Brooks

Inventor:
T. Ollis
Per
Munn & Co.
attorneys

United States Patent Office.

THOMAS OLLIS, OF NETHERFIELD ROAD SOUTH, LIVERPOOL, ENGLAND.

Letters Patent No. 98,098, dated December 21, 1869; Patented in England, March 31, 1868.

IMPROVEMENT IN PASSENGER-REGISTER FOR VEHICLES.

The Schedule referred to in these Letters Patent and making part of the same.

*To all whom it may concern:*

Be it known that I, THOMAS OLLIS, of Netherfield Road South, Liverpool, in the county of Lancaster, England, have invented a new and useful Improvement in Registering-Apparatus for Vehicles; and I do hereby declare that the following is a full, clear, and exact description thereof, which will enable those skilled in the art to make and use the same, reference being had to the accompanying drawings, forming part of this specification.

This invention consists of certain improvements in apparatus for registering the number of passengers entering an omnibus or other vehicle; and the invention consists of the combination, with a suitable number of wheels or disks, revolving on a fixed axis, and having on their peripheries two distinctive divisions, upon each of which is marked a number from 0 to 9, inclusive, of springs operating said wheels at each revolution thereof, by means of stationary projections.

The first number-wheel is provided with a ratchet-escapement, the teeth of which correspond in number with the numbers of the wheel.

The ratchet is operated by an oscillating lever-arm, provided with a pull-handle within reach of the conductor of the vehicle. This oscillating lever has also a counterbalanced catch-lever pivoted thereon, taking into the teeth of the ratchet, for the purpose of partially rotating the same at each oscillation of the lever by the conductor, which is to take place on the entry of each passenger, for the purpose of registering the number using the vehicle.

The motion of each wheel is limited by spring-projections inside the wheel, taking into longitudinal grooves on the boss or central axis, or the spring-projections may be in the axis taking into the grooves in the wheels. A spring-pawl also takes into said ratchet, preventing its backward movement, attached to an arm provided with a hammer, for striking a signal-bell to warn the passengers of the registry being made, the hammer being operated by the motion of the pawl in slipping over the teeth of the ratchet. I prefer to enclose the apparatus in a case provided with a glazed opening at one end, for exhibiting the numbers on the wheels, and with one or several holes for the escape of the sound, but the bell may be placed outside the box, and otherwise connected with the wheels than as before described.

The action of the apparatus is as follows;

Supposing all the wheels to be at zero, the first wheel and ratchet are rotated one tooth, equal to one-tenth of a revolution, by the conductor oscillating the lever-arm, as before mentioned. The effect of this will be to indicate the number 1 at the slit or opening in the case. Each succeeding partial rotation exposes a higher number, until it reaches 9, when a spring-catch or a pawl, by contact with the second wheel, moves it one-tenth, so as to indicate 10.

The first wheel continues its rotation alone until it reaches 19, when the second wheel again moves a tenth round, and so on, similar springs, catches, or pawls on the several wheels, moving them round in the same manner, the third moving one-tenth of a revolution for every revolution of the second wheel, the fourth one-tenth for every revolution of the third, and so on, to indicate hundreds and thousands, or more, if desired.

After the last wheel has performed ten revolutions, the whole will return to zero, ready for recommencing the registering-operation, thus obviating the necessity of resetting the apparatus, the same action taking place, whatever may be the number of wheels employed, which is regulated according to the time the counting is to extend over.

To prevent tampering with the apparatus, I provide a lock, the bolt of which fixes the pull-lever, to prevent improper interference when not in use.

In the accompanying drawing—

Figure 2:
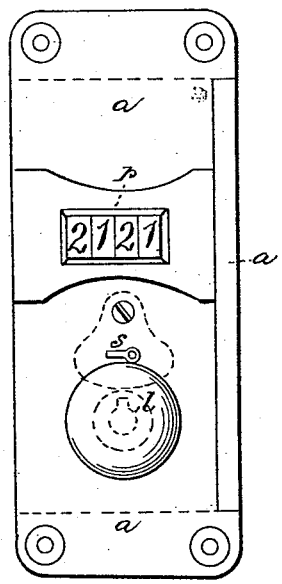

Figure 1 shows a side elevation of the registering-apparatus, with the covering-plate removed;

Figure 2, an end view; and

Figure 3:
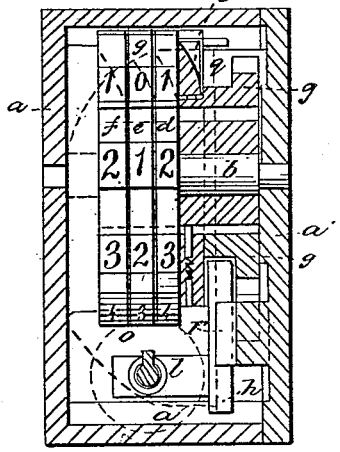

Figure 3, a transverse section of the same on line 1 2, fig. 1.

The apparatus is enclosed in a box or case, *a a*, which is recessed, in the case of an omnibus, into the framing at the back, or in other position, so as to be easily accessible to the conductor for counting the number of passengers entering the vehicle.

At one end of the case *a* is a horizontal fixed axis, *b*, on which are mounted loosely, the wheels or disks *c d e f*, four being shown in this example, although a larger number may be employed.

These wheels have their peripheries divided into ten parts or divisions, as shown in figs. 1 and 3, on each of which is marked a figure from 0 to 9 inclusive. Each wheel is similarly provided with numbers in the manner stated, the wheel *c* representing units, wheel *d* tens, wheel *e* hundreds, and wheel *f* thousands, other wheels being added to indicate tens and hundreds of thousands, if desired. These wheels have independent motion on axis *b*, imparted by a ratchet-escapement, *g*, forming part of the unit-wheel *c*, and having the same number of teeth as the divisions on said wheel, whereby the ratchet and wheel may be rotated one-tenth of a revolution at a time.

The ratchet *g* is rotated by means of a lever-arm, *h*, oscilating on a point, *i*, and provided with a counterbalanced catch-lever, *k*, acting on the teeth of the ratchet *g* every time the pull-handle, and rod *l* connected to lever-arm $h$, is drawn outward, as shown dotted in fig. 1, by the conductor, which takes place as each passenger enters the vehicle.

The oscillation of the lever-arm $h$ is limited by a stop, $k'$, at back of same, which, on completing its forward motion, comes in contact with the number-wheels, and so limits their rotation to the extent required for moving the disks and ratchet one-tenth of a turn, their motion being limited by spring-projections taking into the grooved central boss on which the disks are mounted, as shown in fig. 3 at $x$, or the studs may be carried on the boss and enter orifices in the wheels, if desired. The pull-handle, on being released, immediately returns to position, together with the oscillating lever $h$, in readiness for again acting, by the aid of a spring, on the pull-rod $l$.

The backward motion of the ratchet is prevented by a spring-pawl, $m$, attached to a jointed arm, $n$, provided with a hammer at its other end acting on a signal-bell, $o$, placed inside the case $a$, as shown, every time the knob $l$ is pulled outward, this motion being insured by the slipping of the pawl $m$ over a tooth of the ratchet $g$.

I make a glazed opening, $p$, at one end of the case $a$, just above the knob $l$, as seen in figs. 1 and 2, for exhibiting the numbers on the wheels, the other end of the case being perforated, to allow of the sound from the bell escaping freely, although said bell may be placed outside the case, and otherwise connected with the ratchet than as before described.

A spring, $q$, is mounted on each of the number-wheels, which is depressed once for every entire revolution, by contact with a projection, $r$, on the cover $a'$ of the box $a$, as seen in the section, fig. 3. These springs $q$, are placed in corresponding positions in the several disks, in such manner, that after the wheel $c$ has completed one whole turn, the spring $q$ will be brought in contact with the projection $r$ on the cover, the effect of which is to depress the spring $q$ and bring it in gear with the wheel $d$, for the purpose of rotating it in turn one-tenth of a revolution; and the springs $q$ on the several wheels, being arranged to act on each other, the wheel $d$, after performing an entire revolution, similarly moves the wheel $e$ one-tenth of a turn, by bringing the spring of the said wheel $d$ into gear therewith, as before explained, and so on.

In this manner, the counting will regularly proceed until the wheel $f$ has performed ten revolutions, when the whole will return to zero, in readiness for a fresh counting-operation.

$s$ is a lock, the bolt of which is made to take into the pull-rod $l$, in order to fix the same, and so prevent any tampering with the number-wheels when the apparatus is not in use.

Having thus described my invention,

What I claim as new, and desire to secure by Letters Patent, is—

In combination with a series of numbered disks or wheels, arranged side by side on the common axis $b$, the spring $q$ on each of said wheels, operated at each revolution thereof by the stationary projection $r$, so as to bring the said spring into engagement with the adjoining left-hand wheel at that point, the whole forming a numbering-register, operating substantially as and for the purpose described.

The above specification of my invention signed by me, the 26th of May, 1869.

THOMAS OLLIS.

Witnesses:
 WARDEN BULLARD,
 THOS. B. TOTTEN.